US012596944B2

(12) United States Patent
Lee

(10) Patent No.: US 12,596,944 B2
(45) Date of Patent: Apr. 7, 2026

(54) QUANTUM CIRCUIT T-DEPTH REDUCTION METHOD AND APPARATUS

(71) Applicant: ELECTRONICS AND TELECOMMUNICATIONS RESEARCH INSTITUTE, Daejeon (KR)

(72) Inventor: Jong Heon Lee, Daejeon (KR)

(73) Assignee: Electronics and Telecommunications Research Institute, Daejeon (KR)

( * ) Notice: Subject to any disclaimer, the term of this patent is extended or adjusted under 35 U.S.C. 154(b) by 718 days.

(21) Appl. No.: 17/978,448

(22) Filed: Nov. 1, 2022

(65) Prior Publication Data

US 2023/0162078 A1 May 25, 2023

(30) Foreign Application Priority Data

Nov. 23, 2021 (KR) ........................ 10-2021-0162765
Mar. 29, 2022 (KR) ........................ 10-2022-0039170

(51) Int. Cl.
*G06N 10/20* (2022.01)

(52) U.S. Cl.
CPC .................................... *G06N 10/20* (2022.01)

(58) Field of Classification Search
CPC ...................................................... G06N 10/20
See application file for complete search history.

(56) References Cited

U.S. PATENT DOCUMENTS 10,171,088 B1 1/2019 Kim et al.
2019/0020345 A1* 1/2019 Kim ........................ G06N 10/70

2019/0244128 A1 8/2019 Choi et al.
2020/0184024 A1* 6/2020 Nam ...................... G06F 30/327
2020/0193072 A1* 6/2020 Johansson ............... G06F 7/722

FOREIGN PATENT DOCUMENTS

KR 10-2020-0101333 A 8/2020
KR 10-2021-0093840 A 7/2021

OTHER PUBLICATIONS

Lee et al., T-depth reduction method for efficient SHA-256 quantum circuit construction, Information Security Engineering, Nov. 20, 2021, pp. 1-14 (Year: 2021).*
Amy, Matthew, et al. "Polynomial-time T-depth optimization of Clifford+ T circuits via matroid partitioning." *IEEE Transactions on Computer-Aided Design of Integrated Circuits and Systems* vol. 33. Issue 10 (2014). pp. 1476-1489.
Lee, Jongheon, et al. "T-depth reduction method for efficient SHA-256 quantum circuit construction." *IET Information Security* pp. 1-24, Nov. 20, 2021.
Nam, Yunseong, et al. "Automated optimization of large quantum circuits with continuous parameters." *npj Quantum Information* vol. 4. Issue 1 (2018). pp 1-12.

* cited by examiner

*Primary Examiner* — Nghia M Doan

(74) *Attorney, Agent, or Firm* — NSIP Law

(57) ABSTRACT

Disclosed herein method and apparatus for reducing a T-depth. According to an embodiment of the present disclosure, there is provided a quantum circuit T-depth reduction method comprising: receiving a quantum circuit including two Toffoli gates and a first quantum circuit between the two Toffoli gates; adding a pair of first control P gate and second control P gate to the quantum circuit; and swapping the first quantum circuit and any one of the first control P gate and the second control P gate such that the first quantum circuit is disposed between the first control P gate and the second control P gate.

20 Claims, 16 Drawing Sheets

1500

QUANTUM CIRCUIT T-DEPTH REDUCTION METHOD AND APPARATUS

CROSS REFERENCE TO RELATED APPLICATION

The present application claims priority to Korean Patent Applications 10-2021-0162765, filed Nov. 23, 2021, and 10-2022-0039170, filed Mar. 29, 2022, the entire contents of which is incorporated herein for all purposes by this reference.

BACKGROUND OF THE INVENTION

1. Field of the Invention

The present disclosure relates to quantum circuit T-depth reduction technology, and more particularly, to a T-depth reduction method and apparatus for reducing a T-depth that determines an execution time of a circuit in a quantum circuit

2. Description of the Related Art

In a quantum fault-tolerant model, in a Clifford+T set, a T gate has much more expensive implementation cost than other gates and also has a longest execution time. Accordingly, many studies have been made to reduce a T-depth and a T-count (the number of T gates).

In order to use a Matroid Partitioning-based technique, which is well known as a T-depth reduction technique, it is necessary to understand the Matroid theory of the graph theory.

SUMMARY OF THE INVENTION

An object of the present disclosure is to provide a T-depth reduction method and apparatus for reducing a T-depth that determines an execution time of a circuit in a quantum circuit.

Other objects and advantages of the present invention will become apparent from the description below and will be clearly understood through embodiments. In addition, it will be easily understood that the objects and advantages of the present disclosure may be realized by means of the appended claims and a combination thereof.

Disclosed herein method and apparatus for reducing a T-depth. According to an embodiment of the present disclosure, there is provided a quantum circuit T-depth reduction method comprising: receiving a quantum circuit including two Toffoli gates and a first quantum circuit between the two Toffoli gates; adding a pair of first control P gate and second control P gate to the quantum circuit; and swapping the first quantum circuit and any one of the first control P gate and the second control P gate such that the first quantum circuit is disposed between the first control P gate and the second control P gate.

According to the embodiment of the present disclosure, the quantum circuit T-depth reduction method further comprising determining whether the first quantum circuit and the control P gate are swappable, wherein the swapping comprises swapping the first quantum circuit and the any one control P gate when the first quantum circuit and the control P gate are swappable.

According to the embodiment of the present disclosure, wherein the determining comprises that the first quantum circuit and the any one control P gate are swappable, when a phase when passing through the any one control P gate and the first quantum circuit and a phase when passing through the first quantum circuit and the any one control P gate after the any one control P gate and the first quantum circuit are swapped are the same.

According to the embodiment of the present disclosure, wherein the determining comprises: removing a X gate, H gate and Rz gate of the first quantum circuit; and determining that the first quantum circuit and the any one control P gate are swappable, when a control portion of a control NOT gate of the first quantum circuit, from which the X gate, H gate and Rz gate are removed, is located on any one of two lines of the any one control P gate and a target portion is located on a third line.

According to the embodiment of the present disclosure, wherein the removing comprises removing all H gates located on two lines of the any one control P gate and removing all Rz gates present in the first quantum circuit, after removing the X gate from the first quantum circuit through X gate propagation.

According to the embodiment of the present disclosure, the quantum circuit T-depth reduction method further comprising converting the first quantum circuit into a second quantum circuit corresponding to a function of the first quantum circuit, when the first quantum circuit and the any one control P gate are swapped.

According to the embodiment of the present disclosure, wherein the adding comprises adding a pair of first control P gate and second control P gate in consideration of a control portion and target portion of the Toffoli gate.

According to the embodiment of the present disclosure, wherein the adding comprises adding a control P gate and a control Pt gate to the quantum circuit.

According to another embodiment of the present disclosure, there is provided a quantum circuit T-depth reduction method comprising: adding a control P gate and a control Pt gate to a quantum circuit including two Toffoli gates and a first quantum circuit between the two Toffoli gates; determining whether the first quantum circuit and any one of the control P gate and the control Pt gate are swappable; swapping the first quantum circuit and any one gate when the first quantum circuit and any one gate are swappable.

According to another embodiment of the present disclosure, there is provided a quantum circuit T-depth reduction apparatus comprising: a receiving unit configured to receive a quantum circuit including two Toffoli gates and a first quantum circuit between the two Toffoli gates; an adding unit configured to add a pair of first control P gate and second control P gate to the quantum circuit; and an swap unit configured to swap the first quantum circuit and any one of the first control P gate and the second control P gate such that the first quantum circuit is disposed between the first control P gate and the second control P gate.

The features briefly summarized above with respect to the present disclosure are merely exemplary aspects of the detailed description below of the present disclosure, and do not limit the scope of the present disclosure.

According to the present disclosure, it is possible to provide a T-depth reduction method and apparatus for reducing a T-depth that determines an execution time of a circuit in a quantum circuit.

Effects obtained in the present disclosure are not limited to the above-mentioned effects, and other effects not mentioned above may be clearly understood by those skilled in the art from the following description.

BRIEF DESCRIPTION OF THE DRAWINGS

The above and other objects, features and other advantages of the present invention will be more clearly understood from the following detailed description taken in conjunction with the accompanying drawings, in which.

DESCRIPTION OF THE PREFERRED EMBODIMENTS

Figure 1:
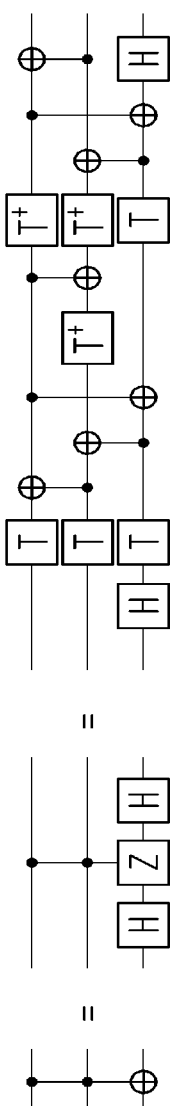
FIG. 1 is a view illustrating an example of a Toffoli gate.
Figure 2:
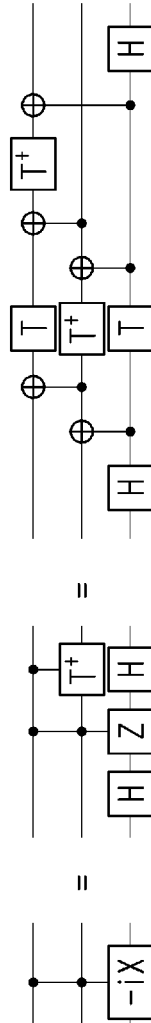
FIG. 2 is a view illustrates an example of a combination of a Toffoli gate and CP†.

Hereinafter, exemplary embodiments of the present disclosure will be described in detail with reference to the accompanying drawings so that those skilled in the art may easily implement the present disclosure. However, the present disclosure may be implemented in various different ways, and is not limited to the embodiments described therein.

In describing exemplary embodiments of the present disclosure, well-known functions or constructions will not be described in detail since they may unnecessarily obscure the understanding of the present disclosure. The same constituent elements in the drawings are denoted by the same reference numerals, and a repeated description of the same elements will be omitted.

In the present disclosure, when an element is simply referred to as being "connected to", "coupled to" or "linked to" another element, this may mean that an element is "directly connected to", "directly coupled to" or "directly linked to" another element or is connected to, coupled to or linked to another element with the other element intervening therebetween. In addition, when an element "includes" or "has" another element, this means that one element may further include another element without excluding another component unless specifically stated otherwise.

In the present disclosure, elements that are distinguished from each other are for clearly describing each feature, and do not necessarily mean that the elements are separated. That is, a plurality of elements may be integrated in one hardware or software unit, or one element may be distributed and formed in a plurality of hardware or software units. Therefore, even if not mentioned otherwise, such integrated or distributed embodiments are included in the scope of the present disclosure.

In the present disclosure, elements described in various embodiments do not necessarily mean essential elements, and some of them may be optional elements. Therefore, an embodiment composed of a subset of elements described in an embodiment is also included in the scope of the present disclosure. In addition, embodiments including other elements in addition to the elements described in the various embodiments are also included in the scope of the present disclosure.

In the present document, such phrases as 'A or B', 'at least one of A and B', 'at least one of A or B', 'A, B or C', 'at least one of A, B and C' and 'at least one of A, B or C' may respectively include any one of items listed together in a corresponding phrase among those phrases or any possible combination thereof.

Embodiments of the present disclosure are to efficiently reduce a T-depth that determines the execution time of a circuit in a quantum circuit made using a Clifford+T set, which is a standard full fault-tolerant gate set, and to reduce the T-depth by reducing the number of T gates in a Toffoli gate widely used in the quantum circuit.

Here, the T-depth may mean a depth formed by T gates in a critical path of the quantum circuit.

In the quantum circuit, the Clifford+T set forms the standard full fault-tolerant set. In the quantum circuit, a H gate, a X gate, a T gate, a P gate, a Z gate, and a CNOT gate are most widely used, and the H gate, the X gate, the T gate, the P gate, the Z gate and the CNOT gate may operate as shown in [Equation 1] below.

$$H: |x_1\rangle \rightarrow \frac{|0\rangle + (-1)^{x_1}|1\rangle}{\sqrt{2}} \quad X: |x_1\rangle \rightarrow |x_1 \oplus 1\rangle \quad \text{[Equation 1]}$$

$$T: |x_1\rangle \rightarrow e^{\frac{\pi i}{4}x_1}|x_1\rangle \quad P: |x_1\rangle \rightarrow e^{\frac{\pi i}{2}x_1}|x_1\rangle$$

$$Z: |x_1\rangle \rightarrow (-1)^{x_1}|x_1\rangle \quad CNOT: |x_1x_2\rangle \rightarrow |x_1(x_1 \oplus x_2)\rangle$$

where, $\oplus$ may mean a modulo-2 addition.

In an embodiment of the present disclosure, a Toffoli gate is used to reduce the T-depth. The Toffoli gate consists of two control portions and one target portion, and may be decomposed into two H gates and one $C^2Z$ gate (double control Z gate) as shown in FIG. 1.

The $C^2NOT$ gate (double control NOT gate) and the $C^2Z$ gate may operate as shown in [Equation 2] below.

$$C^2NOT: |x_1x_2x_3\rangle \rightarrow |x_1x_2(x_3 \oplus (x_1 \wedge x_2))\rangle \quad C^2Z: |x_1x_2x_3\rangle$$
$$\rangle \rightarrow (-1)^{x_1x_2x_3}|x_1x_2x_3\rangle \quad \text{[Equation 2]}$$

The Toffoli gate and the $C^2Z$ gate consist of a total of seven T gates and T† gate, forming T-depth 3. When variables corresponding to lines are respectively $x_1$, $x_2$, and $x_3$, the $C^2Z$ gate creates a phase $$e^{\frac{\pi i}{4}x_1x_2x_3}.$$

In this case, $4x_1x_2x_3$ satisfies [Equation 3] below.

$$4x_1x_2x_3=x_1+x_2+x_3-x_1\oplus x_2-x_2\oplus x_3-x_1\oplus x_3+x_1\oplus x_2\oplus x_3 \qquad \text{[Equation 3]}$$

It can be seen from Equation 3 that the $C^2Z$ gate consists of seven operands, and each operand corresponds to the T gate and the $T^\dagger$ gate. That is, the $C^2Z$ gate consists of four T gates and three $T^\dagger$ gates, which can also be seen from FIG. 1.

On the other hand, a $P^\dagger$ gate ($CP^\dagger$ gate) creates a phase $$e^{-\frac{\pi i}{4}2x_1x_2},$$

and consists of one T gate and two $T^\dagger$ gates because it is $^2x_1\wedge x_2=x_1+x_2-x_1 e\ x_2$. When the Toffoli gate and the $CP^\dagger$ gate are combined, it becomes a $C^2(-iX)$ gate and consists of two T gates and two $T^\dagger$ gates, which can also be seen from [Equation 4] below.

$$x_1+x_2+x_3-x_1\oplus x_2-x_2\oplus x_3-x_1\oplus x_3+x_1\oplus x_2\oplus x_3-(x_1+x_2-x_1\oplus x_2)=x_3-x_2\oplus x_3-x_1\oplus x_3+x_1\oplus x_2\oplus x_3 \qquad \text{[Equation 4]}$$

When the $CP^\dagger$ gate is added to the quantum circuit, the T-depth may be reduced by a property that the T-depth and the t-count are reduced due to deformation of the Toffoli gate. Embodiments of the present disclosure may use this property to reduce the T-depth. That is, embodiments of the present disclosure are technologies capable of reducing the T-depth when there are two Toffoli gates in a quantum circuit and a certain subcircuit A is present between the Toffoli gates. Here, the subcircuit A may refer to a quantum circuit disposed between two Toffoli gates.

Figure 3:
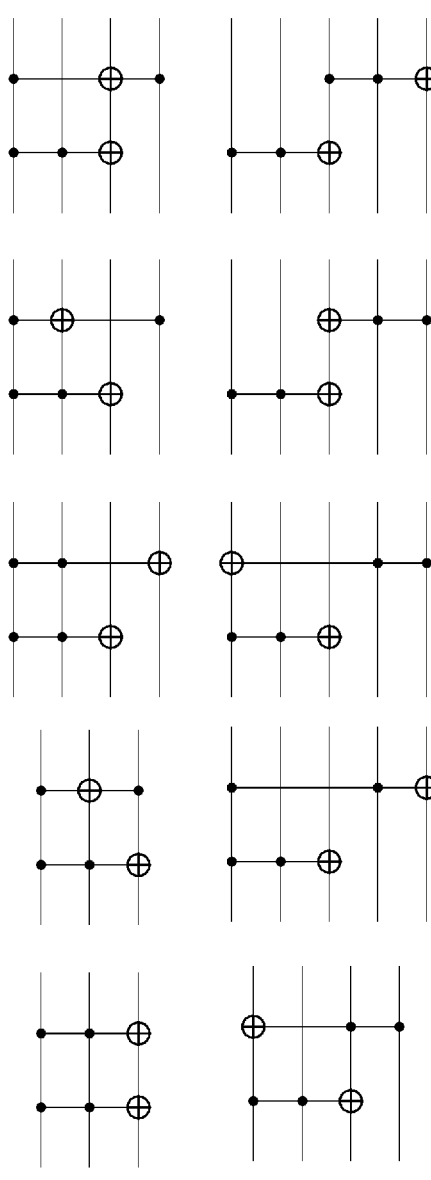
FIG. 3 is a view illustrating embodiments of two Toffoli gates.

As shown in FIG. 3, there may be a total 10 types of relative arrangements of the two Toffoli gates in the quantum circuit. In the detailed description of the present disclosure, first, third, and ninth cases among the ten cases shown in FIG. 3 will be described. Here, in the first case, all the control portions and target portion of the two Toffoli gates share the same circuit line. In the third case, only the control portions of the two Toffoli gates share the same circuit line. In the ninth case, only the target portion shares the circuit line. Of course, it is apparent to those skilled in the art that the method of the present disclosure may be applied to the remaining seven cases to reduce the T-depth.

Figure 4:
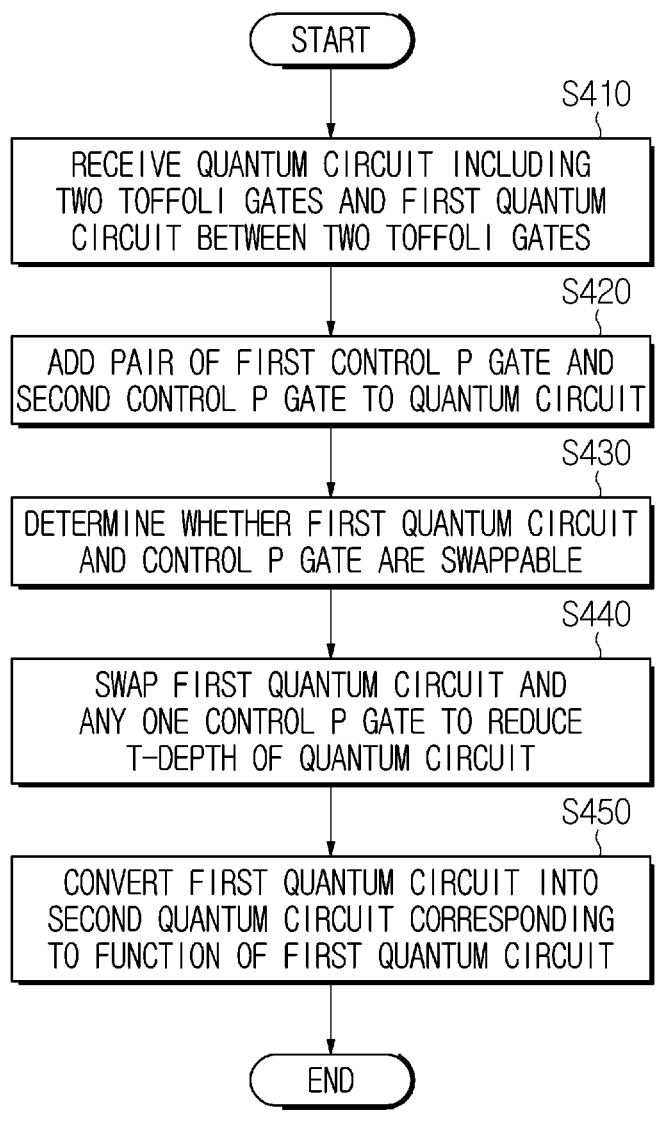
FIG. 4 is a flowchart illustrating a quantum circuit T-depth reduction method according to an embodiment of the present disclosure.

FIG. 4 is a flowchart illustrating a quantum circuit T-depth reduction method according to an embodiment of the present disclosure.

Referring to FIG. 4, the quantum circuit T-depth reduction method according to an embodiment of the present disclosure receives a quantum circuit including two Toffoli gates and a first quantum circuit, for example, a subcircuit A, between the two Toffoli gates (S410).

Here, step S410 is a process of receiving a quantum circuit for reducing the T-depth. A quantum circuit including the shape of two Toffoli gates and a subcircuit A present therebetween is received.

When the quantum circuit including the shape of the two Toffoli gates and the subcircuit A present therebetween is received in step S410, a pair of first control P gate (first CP gate) and second control P gate (second CP gate) for reducing the T-depth is added to the received quantum circuit (S420).

Here, the first CP gate and the second CP gate are a CP gate and a $CP^\dagger$ gate, respectively, and, since the two CP gates are inversely related to each other, the result of the quantum circuit is not affected.

The pair of CP gate and $CP^\dagger$ gates added in step S420 may be added to the quantum circuit in consideration of the control portion and target portion of the Toffoli gate. For example, the pair of CP gate and $CP^\dagger$ gates may be added to the circuit line of the control portion of the Toffoli gate. According to an embodiment, in step S420, the pair of CP gate and $CP^\dagger$ gate may be added between the left Toffoli gate and the subcircuit A.

When the pair of CP gate and $CP^\dagger$ gate is added to the quantum circuit in step S420, it is determined whether the first quantum circuit, that is, the subcircuit A, and any one of the CP gate and the $CP^\dagger$ gate are swappable or not, and, if so, the subcircuit A and any one of the CP gate and the $CP^\dagger$ gate are swapped in order to reduce the T-depth of the quantum circuit (S430, S440).

According to an embodiment, in step S430, if a phase when passing through any one of the CP gate and the $CP^\dagger$ gate and the subcircuit A and a phase when passing through any one of the CP gate and the $CP^\dagger$ gate and the subcircuit A after any one of the CP gate and the $CP^\dagger$ gate and the subcircuit A are swapped are the same, it may be determined that any one of the CP gate and the $CP^\dagger$ gate and the subcircuit A are swappable.

According to another embodiment, in step S430, the X gate, H gate and $R_z$ gate of the subcircuit A are removed and, when the control portion of the control NOT gate (CNOT gate) of the subcircuit A, from which the X gate, the H gate and the $R_z$ gate are removed, is located on any one of two lines of any one of the CP gate and the $CP^\dagger$ gate and the target portion is located on a third line, it may be determined that any one of the CP gate and the $CP^\dagger$ gate and the subcircuit A are swappable. Here, in step S430, after the X gate is removed from the subcircuit A through X gate propagation, all H gates located on two lines of any one of the CP gate and the $CP^\dagger$ gate may be removed and all $R_z$ gates present in the subcircuit A may be removed. Such a determination process will be described with reference to FIGS. 10 to 13.

When the subcircuit A and any one of the CP gate and the $CP^\dagger$ gate are swapped in step S440, the subcircuit A is converted into a new subcircuit A' corresponding to a function of the subcircuit A according to the swap (S450).

Here, in step S450, the subcircuit A may be converted into the subcircuit A' using X gate propagation, H gate reduction, $R_z$ gate removal, and CNOT gate determination operation that are performed in the process of determining whether swap is possible.

In step S450, the subcircuit A may be converted into the subcircuit A' by using a reduction technique presented for various quantum circuits, by those of ordinary skill in the art of the present disclosure.

The method according to the embodiment of the present disclosure will be described with reference to FIGS. 5 to 14.

Figure 5:
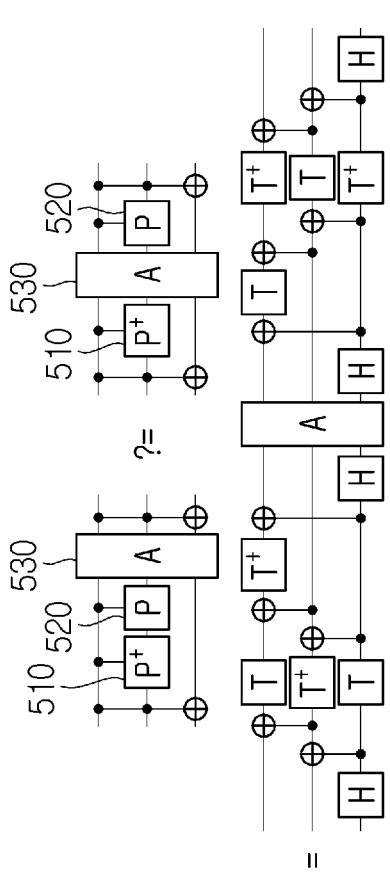
FIG. 5 is a view illustrates an example of T-depth reduction by swap of a subcircuit and a CP gate.

FIG. 5 is a view illustrates an example of T-depth reduction by swap of a subcircuit and a CP gate, which illustrates the first case of FIG. 3 in which all the control portions and target portion of two Toffoli gates share the same circuit lines.

As shown in FIG. 5, it can be seen that a $CP^\dagger$ gate 510 and a CP gate 520 connected to a control portion may be present on the right portion of the left Toffoli gate. Since the two gates 510 and 520 are inversely related to each other, the result of the circuit is not affected. Now, if the CP gate 520 is swappable with the subcircuit A 530 present on the right side, that is, if swap is possible, the total T-depth may be reduced from 6 to 4 as described above. That is, as each of the two Toffoli gates is combined with the CP gate 520 and the $CP^\dagger$ gate 510, the T-depth is reduced from 3 to 2, so that the T-depth of the quantum circuit is reduced from 6 to 4.

Figure 6:
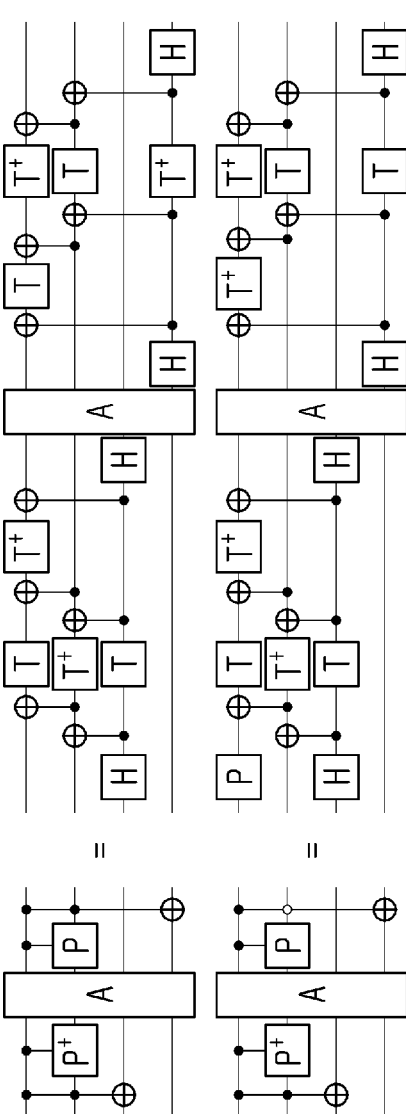
FIG. 6 is a view illustrates another example of T-depth reduction by swap of a subcircuit and a CP gate.

FIG. 6 is a view illustrates another example of T-depth reduction by swap of a subcircuit and a CP gate, which illustrates the third case of FIG. 3 in which the control lines of the control portions of two Toffoli gates are shared but the target line of the target portion is not shared.

In FIG. 6, similar to FIG. 5, when swap of the CP gate and the subcircuit A is possible in a state in which the CP† gate and the CP gate are added between the left Toffoli gate and the subcircuit A, the total T-depth may be reduced from 6 to 4. When a part of the control portion of the Toffoli gate is a negative control portion, as shown in FIG. 6, a P gate and a P† gate may be generated in the quantum circuit.

Figure 7:
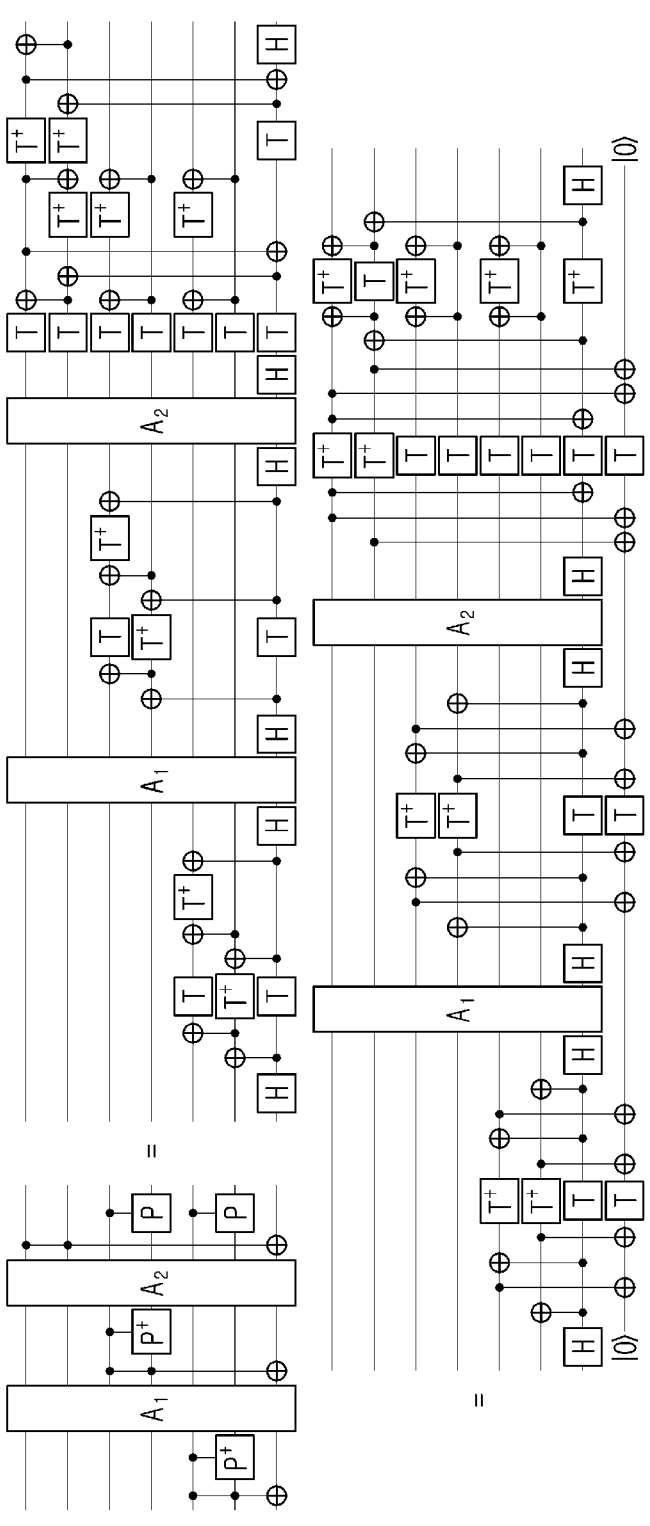
FIG. 7 is a view illustrates another example of T-depth reduction by swap of a subcircuit and a CP gate.

FIG. 7 is a view illustrates another example of T-depth reduction by swap of a subcircuit and a CP gate, which illustrates the ninth case of FIG. 3 in which only the target line of the target portion of the two Toffoli gates is shared. FIG. 7 illustrates the case which may be applied even when two or more Toffoli gates are present.

As shown in FIG. 7, if the CP gates are swappable with the subcircuits $A_1$ and $A_2$, the T-depth can be reduced by locating the T gates of the CP gates on the same time line as the T gates of the rightmost Toffoli gate. That is, the T-depth may be shared. At this time, for n≥2 Toffoli gates, the T-depth may be reduced from 3n to 2n+1. If there is one auxiliary qubit, the T-depth may be reduced to n+1.

Figure 8:
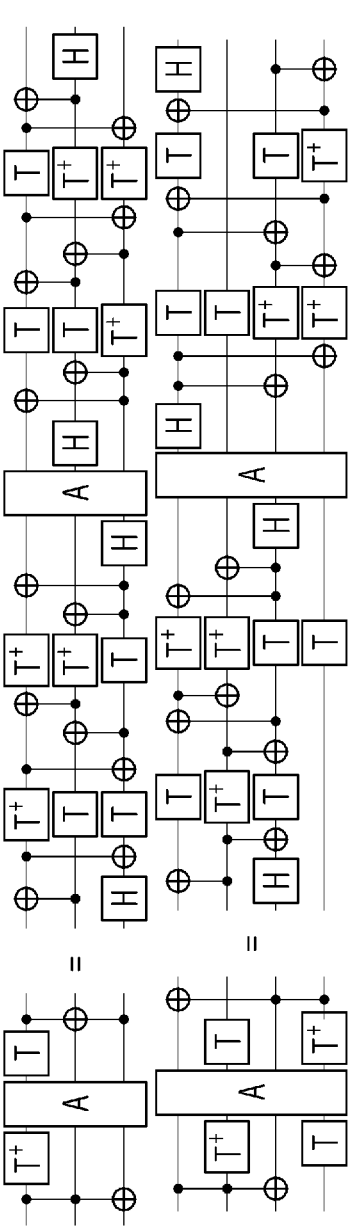
FIG. 8 is a view illustrates another example of T-depth reduction by swap of a subcircuit and a CP gate.

In addition, in the three cases described above, in five cases of FIG. 3, that is, the fourth case, the fifth case, the seventh case, the eighth case and the tenth case, the T-depth may be reduced by locating the CP gate and the CP† gate similarly to the above-described method. On the other hand, in the second case and the sixth case of FIG. 6, unlike the other cases, the CP gate and the CP† gate cannot be immediately used. This is because the location of the H gate formed by the Toffoli gates makes it difficult to use. The H gate and the T gate are generally not swappable. Accordingly, when the T gate forming the CP gate and the H gate in the Toffoli gate are present on the same line, the T-depth may not be reduced through a combination with the Toffoli gate. In this case, as shown in FIG. 8, since the H gate is present in the target portion of the Toffoli gate, the T-depth may be reduced from 6 to 4 by using a pair of T gate and T† gate while avoiding the target portion.

The CP gate may perform operation shown in [Equation 5] below.

$$\text{Controlled} - P: \ |x_1 x_2\rangle \rightarrow e^{\frac{\pi i}{4} 2x_1 \wedge x_2} |x_1 x_2\rangle \qquad \text{[Equation 5]}$$

As can be seen from Equation 5 above, the CP gate maintains base variables $x_1$ and $x_2$ corresponding to each line of the quantum circuit without change and creates a phase $$e^{\frac{\pi i}{4} 2x_1 x_2}.$$

That is, if the subcircuit A is swappable with the CP gate, $$e^{\frac{\pi i}{4} 2x_1 x_2}$$

shall be created even after the subcircuit A is first executed instead of the CP gate and even when passing through the CP gate.

Figure 9:
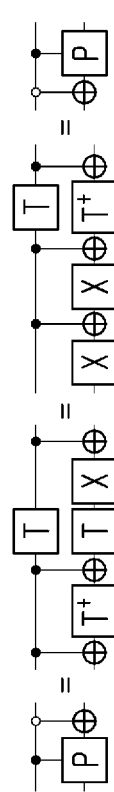
FIG. 9 is a view illustrating swappability between an Off-controlled-NOT gate and a CP gate.

For example, as shown in FIG. 9 which shows swappability between an Off-controlled-NOT gate and a CP gate, it can be seen that a NOT gate whose control portion is negative and a CP gate are swappable. That is, even if the NOT gate whose control portion is negative and the CP gate are swapped, a phase $$e^{\frac{\pi i}{4} 2x_1 x_2}$$

is created when passing through the CP gate. This can also be seen through [Equation 6] below.
[Equation 6]

Hereinafter, the process of one embodiment of determining swappability of the CP gate and $x_2 \rightarrow -x_1 \oplus x_2 \Rightarrow x_1 + x_2 - x_1 \oplus x_2 \rightarrow x_1 - x_1 \oplus x_2 - (x_1 \oplus - (x_1 \oplus x_2)) = x_1 + x_2 - x_1 \oplus x_2$ the subcircuit A in order to reduce the T-depth will be described, and as described above, a quantum circuit consisting of a Clifford+T set will be described as an example. Typical gates representatively used in the Clifford+T set include a H gate, a X gate, a $R_z$ (T, P, Z) gate, and a CNOT gate.

Figure 10:
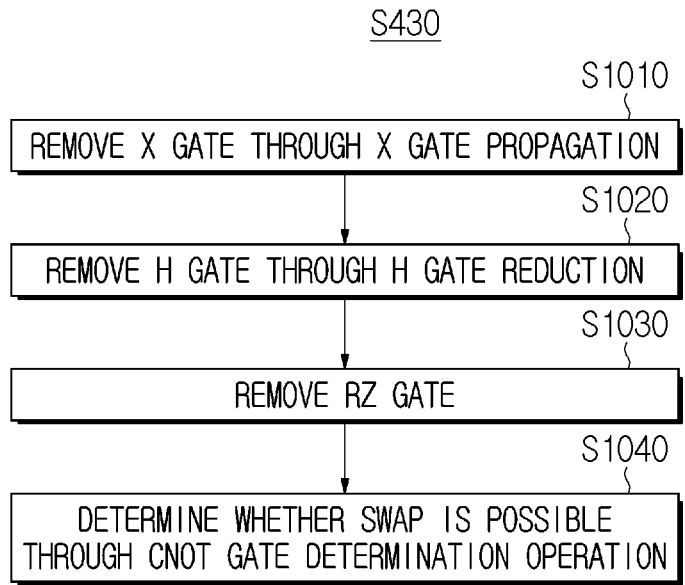
FIG. 10 is a flowchart of an embodiment of step S430 of FIG. 3.

FIG. 10 is a flowchart of an embodiment of step S430 of FIG. 3 and is a flowchart in the subcircuit A.

Referring to FIG. 10, step S430 of determining whether the subcircuit A and any one of the CP gate and the CP† gate are swappable includes step S1010 of removing a X gate through X gate propagation, step S1020 of removing a H gate through H gate reduction, step S1030 of removing a R, gate and step S1040 of determining whether swap is possible through CNOT gate determination operation.

In step S1010, all X gates in the subcircuit A are removed through propagation. That is, it continues to be moved to the right until it is adjacent to the Toffoli gate.

Figure 11:
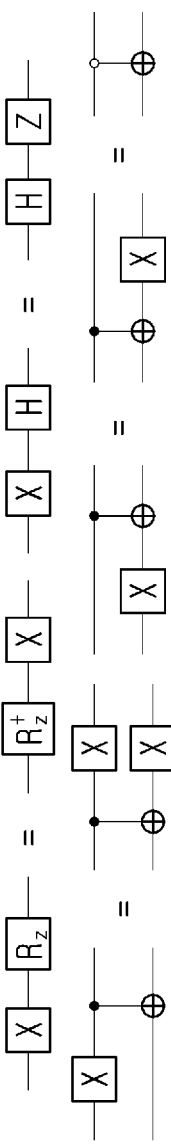
FIG. 11 is a view illustrating an example of a process of removing a X gate.

FIG. 11 is a view illustrating an example of a process of removing a X gate, which illustrates how an adjacent gate is converted as the X gate is moved to the right. As shown in FIG. 11, when the X gate reaches the right Toffoli gate through X gate propagation, the control portion of the Toffoli gate is changed to negative and the X gate is generated on the right side of the Toffoli gate, thereby removing all X gates from the subcircuit A.

Figure 12:
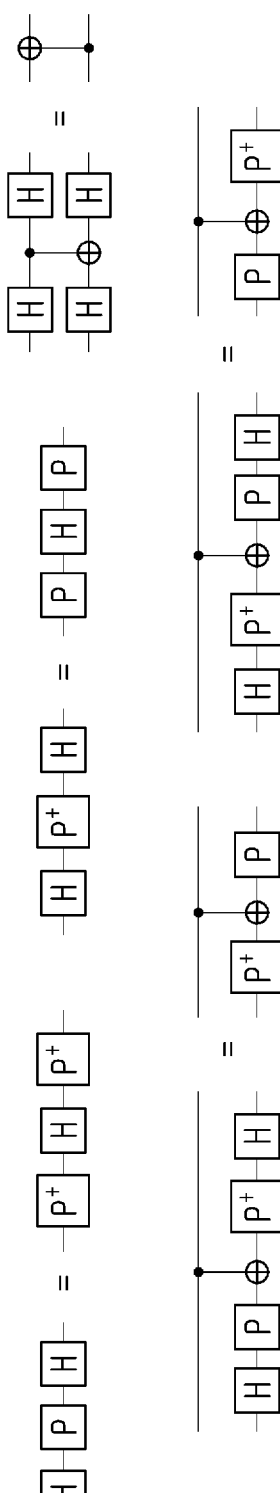
FIG. 12 is a view illustrating an example of a process of removing a H gate.

In step S1020, the H gate may be reduced by using various identical equations as shown in FIG. 12. That is, in step S1020, in the subcircuit A from which the X gate is removed, the H gate reduction continues until all the H gates are removed from both lines where the CP gate is located. Of course, if the Z gate, H gate, and CNOT gate are adjacent to each other at the same location in the same shape during the reduction, they may be removed because they are inversely related to each other. If all the H gates cannot be removed from at least one of the two lines where the CP gate is located, the CP gate cannot be swapped with the subcircuit A.

Step S1030 is a process of removing the R, gate from the subcircuit A in a state in which both the X gate and the H gate are removed. Through the process of up to step S1020, only the $R_z$ gate and the CNOT gate are present in the subcircuit A. Embodiments of the present disclosure are interested in whether action of the CP gate will be the same even if it passes through the subcircuit A first. All $R_z$ gates are negligible since they have no effect on this action. Therefore, all $R_z$ gates are removed.

In step S1040, since the CP gate effect is not affected when the control portion of the CNOT gate is located on one of two lines of the CP gate and the target portion is located on a third line in the subcircuit A consisting of only a CNOT gate, it is determined that the CP gate and the subcircuit A is swappable. On the other hand, when the control portion of the CNOT gate is located on one of two lines of the CP gate and the target portion is located on the other line in the subcircuit A consisting of only a CNOT gate, a base variable corresponding to the other line is changed and thus the CP gate cannot create a desire phase. Accordingly, in this case, it is determined that swappability of the CP gate and the subcircuit A is impossible.

Figure 13:
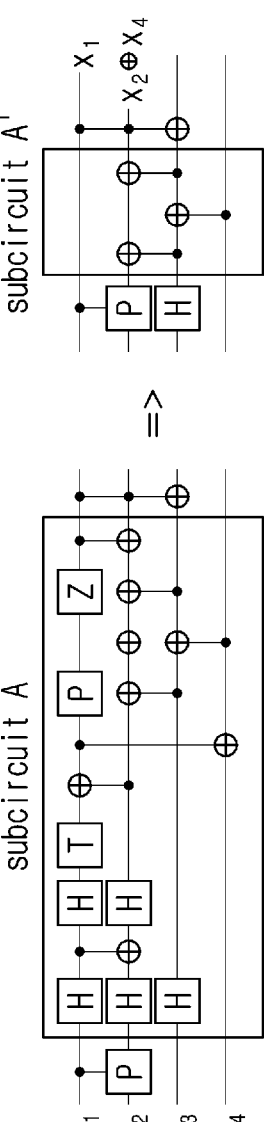
FIG. 13 is a view illustrating an example of swap of a CP gate and a subcircuit.

FIG. 13 is a view illustrating an example of swap of a CP gate and a subcircuit A. As shown in FIG. 13, to determine whether the CP gate and the subcircuit A are swappable, X gate propagation is first performed, and then H gate reduction is performed. At this time, since the CP gate is located on the first and second lines, it is not necessary to remove the H gate located on the third line. Then, all $R_z$ gates are removed, and, finally, CNOT gate determination operation is performed. It can be seen that this subcircuit A is not swappable in this last CNOT gate determination operation. It can be seen from the converted subcircuit A' that the CNOT gates cause a change in the base variable, and the CP gate cannot create the desired phase. Therefore, in the case of FIG. 13, the CP gate and the subcircuit A are not swappable.

Figure 14:
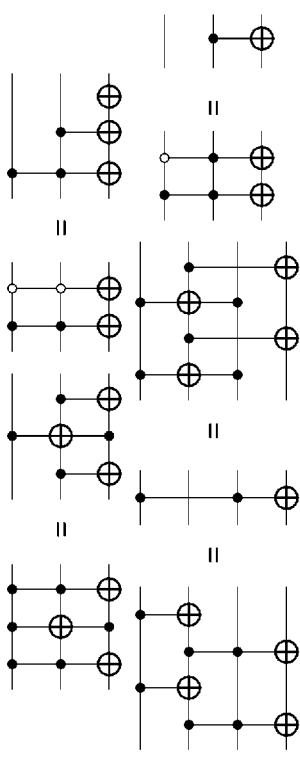
FIG. 14 is a view illustrating an example of T-depth reduction according to reduction in the number of Toffoli gates.

There is a point to be noted when using the method of determining whether the CP gate and the subcircuit A are swappable through the process shown in FIG. 10. First, if the subcircuit A is very complex, it may be necessary to repeat the subroutines of FIG. 10 several times. For example, if there are many Toffoli gates in the subcircuit A, it is difficult to reduce all H gates through only one operation. Second, if the subcircuit A has a special shape, the Toffoli gates on both sides may be reduced to one Toffoli gate. For example, as shown in FIG. 14, it can be seen that, when the subcircuit A has a special shape and the Toffoli gates on both sides are reduced to one Toffoli gate, the number of Toffoli gates is reduced so that the total T-depth is reduced from 6 to 3, not to 4. Therefore, it is also possible to further reduce the T-depth through the shape of the quantum circuit.

As such, in the quantum circuit T-depth reduction method according to the embodiments of the present disclosure, by reducing the T-depth of the quantum circuit, it is possible to dramatically reduce the execution time of the quantum circuit to enable an efficient circuit design.

Also, in the quantum circuit T-depth reduction method according to the embodiments of the present disclosure, it is possible to reduce the T-depth of the quantum circuit by much more intuitively understandable and faster application than using the conventionally known Matroid Partitioning-based algorithm.

Figure 15:
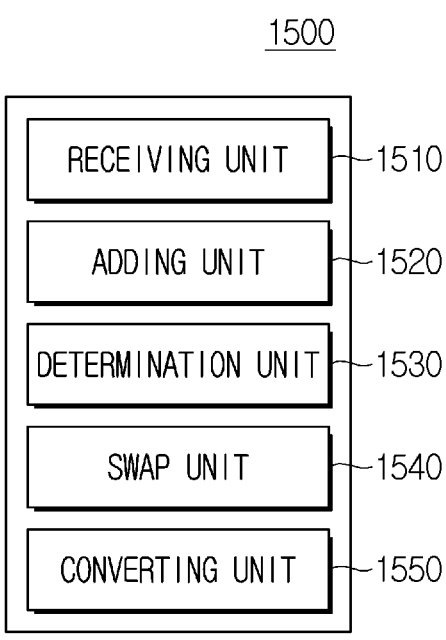
FIG. 15 is a view illustrating a configuration of a quantum circuit T-depth reduction apparatus according to another embodiment of the present disclosure.

FIG. 15 is a view illustrating a configuration of a quantum circuit T-depth reduction apparatus according to another embodiment of the present disclosure, which illustrates a configuration of an apparatus for performing the methods of FIGS. 1 to 14.

Referring to FIG. 15, the quantum circuit T-depth reduction apparatus 1500 according to another embodiment of the present disclosure includes a receiving unit 1510, an adding unit 1520, a determination unit 1530, an swap unit 1540 and a converting unit 1550.

The receiving unit 1510 receives a quantum circuit including two Toffoli gates and a first quantum circuit between the two Toffoli gates.

The adding unit 1520 adds a pair of CP gate and $CP^\dagger$ gate for reducing the T-depth to the quantum circuit received through the receiving unit 1501.

In this case, the adding unit 1520 may add the pair of CP gate and $CP^\dagger$ gate to the quantum circuit in consideration of a control portion and target portion of the Toffoli gate.

The determination unit 1530 determines whether the subcircuit A and any one of the CP gate and the $CP^\dagger$ gate are swappable.

According to an embodiment, the determination unit 1530 may determine that the subcircuit A and any one of the CP gate and the $CP^\dagger$ gate are swappable, when the phase when passing through any one of the CP gate and the $CP^\dagger$ gate and the subcircuit A and the phase when passing through any one of the CP gate and the $CP^\dagger$ gate and the subcircuit A after any one of the CP gate and the $CP^\dagger$ gate and the subcircuit A are swapped are the same, it may be determined that any one of the CP gate and the $CP^\dagger$ gate and the subcircuit A are swappable.

According to another embodiment, the determination unit 1530 may reduce the X gate, H gate and $R_z$ gate of the subcircuit A, and determine that the subcircuit A and any one of the CP gate and the $CP^\dagger$ gate are swappable when the control portion of the CNOT gate of the subcircuit A, from which the X gate, the H gate and the $R_z$ gate are removed, is located on any one of two lines of any one of the CP gate and the $CP^\dagger$ gate and the target portion is located on a third line. Here, the determination unit 1530 may remove all H gates located on two lines of any one of the CP gate and the $CP^\dagger$ gate and remove all $R_z$ gates present in the subcircuit A, after the X gate is removed from the subcircuit A through X gate propagation.

The swap unit 1540 swaps the subcircuit A and any one of the CP gate and the $CP^\dagger$ gate to reduce the T-depth of the quantum circuit when the subcircuit A and any one of the CP gate and the $CP^\dagger$ gate are swappable.

The converting unit 1550 converts the subcircuit A into a new subcircuit A' corresponding to the function of the subcircuit A according to swap of the subcircuit A and any one of the CP gate and the $CP^\dagger$ gate.

In this case, the subcircuit A may be converted into the subcircuit A' using X gate propagation, H gate reduction, $R_z$ gate removal, and CNOT gate determination operation that are performed in the process of determining whether the subcircuit A and any one of the CP gate and the $CP^\dagger$ gate are swappable.

Although the description is omitted in the apparatus of FIG. 15, the apparatus according to the embodiment of the present disclosure may include all descriptions of the method of FIG. 14, which is apparent to those skilled in the art.

Figure 16:
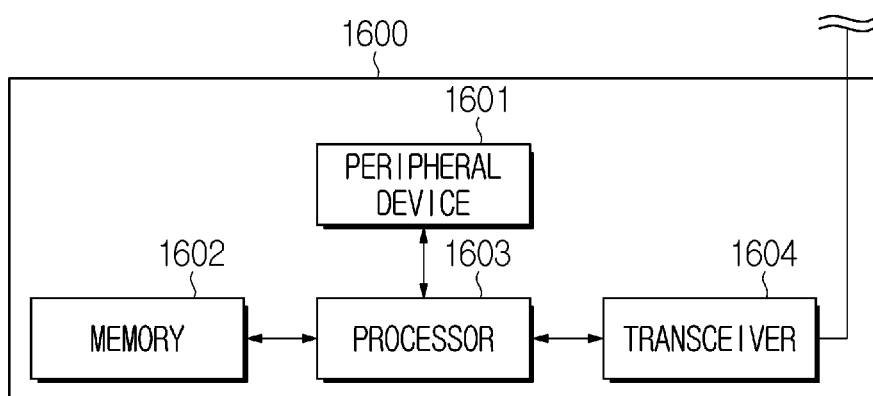
FIG. 16 is a view illustrating a configuration of a device, to which a quantum circuit T-depth reduction apparatus according to another embodiment of the present disclosure is applied.

FIG. 16 is a view illustrating a configuration of a device, to which a quantum circuit T-depth reduction apparatus according to another embodiment of the present disclosure is applied.

The quantum circuit T-depth reduction apparatus according to an embodiment of the present disclosure of FIG. 15 may be a device 1600 of FIG. 16. Referring to FIG. 16, the device 1600 may include a memory 1602, a processor 1603, a transceiver 1604 and a peripheral device 1601. In addition, for example, the device 1600 may further include another configuration and is not limited to the above-described embodiment. Herein, for example, the device 1600 may be a mobile user terminal (e.g., a smartphone, a laptop, a wearable device, etc.) or a fixed management device (e.g., a server, a PC, etc.).

More specifically, the device 1600 of FIG. 16 may be an exemplary hardware/software architecture such as a quantum circuit design apparatus and a quantum circuit conversion reduction apparatus. Herein, as an example, the memory 1602 may be a non-removable memory or a removable memory. In addition, as an example, the peripheral device 1601 may include a display, GPS or other peripherals and is not limited to the above-described embodiment.

In addition, as an example, like the transceiver 1604, the above-described device 1600 may include a communication circuit. Based on this, the device 1600 may perform communication with an external device.

In addition, as an example, the processor 1603 may be at least one of a general-purpose processor, a digital signal processor (DSP), a DSP core, a controller, a micro controller, application specific integrated circuits (ASICs), field programmable gate array (FPGA) circuits, any other type of integrated circuit (IC), and one or more microprocessors related to a state machine. In other words, it may be a hardware/software configuration playing a controlling role for controlling the above-described device 1600. In addition, the processor 1603 may be performed by modularizing the functions of the adding unit 1520, the determination unit 1530, the swap unit 1540 and the converting unit 1550 of FIG. 15.

Herein, the processor 1603 may execute computer-executable commands stored in the memory 1602 in order to implement various necessary functions of the quantum circuit T-depth reduction apparatus. As an example, the processor 1603 may control at least any one operation among signal coding, data processing, power controlling, input and output processing, and communication operation. In addition, the processor 1603 may control a physical layer, an MAC layer and an application layer. In addition, as an example, the processor 1603 may execute an authentication and security procedure in an access layer and/or an application layer but is not limited to the above-described embodiment.

In addition, as an example, the processor 1603 may perform communication with other devices via the transceiver 1604. As an example, the processor 1603 may execute computer-executable commands so that the quantum circuit T-depth reduction apparatus may be controlled to perform communication with other devices via a network. That is, communication performed in the present invention may be controlled. As an example, the transceiver 1604 may send a RF signal through an antenna and may send a signal based on various communication networks.

In addition, as an example, MIMO technology and beam forming technology may be applied as antenna technology but are not limited to the above-described embodiment. In addition, a signal transmitted and received through the transceiver 1604 may be controlled by the processor 1603 by being modulated and demodulated, which is not limited to the above-described embodiment.

While the exemplary methods of the present disclosure described above are represented as a series of operations for clarity of description, it is not intended to limit the order in which the steps are performed, and the steps may be performed simultaneously or in different order as necessary. In order to implement the method according to the present disclosure, the described steps may further include other steps, may include remaining steps except for some of the steps, or may include other additional steps except for some of the steps.

The various embodiments of the present disclosure are not a list of all possible combinations and are intended to describe representative aspects of the present disclosure, and the matters described in the various embodiments may be applied independently or in combination of two or more.

In addition, various embodiments of the present disclosure may be implemented in hardware, firmware, software, or a combination thereof. In the case of implementing the present invention by hardware, the present disclosure can be implemented with application specific integrated circuits (ASICs), Digital signal processors (DSPs), digital signal processing devices (DSPDs), programmable logic devices (PLDs), field programmable gate arrays (FPGAs), general processors, controllers, microcontrollers, microprocessors, etc.

The scope of the disclosure includes software or machine-executable commands (e.g., an operating system, an application, firmware, a program, etc.) for enabling operations according to the methods of various embodiments to be executed on an apparatus or a computer, a non-transitory computer-readable medium having such software or commands stored thereon and executable on the apparatus or the computer.

What is claimed is:

1. A quantum circuit T-depth reduction method comprising:

receiving a quantum circuit including two Toffoli gates and a first quantum circuit between the two Toffoli gates;

adding a pair of first control P gate and second control P gate to the quantum circuit; and swapping the first quantum circuit and any one of the first control P gate and the second control P gate such that the first quantum circuit is disposed between the first control P gate and the second control P gate.

2. The quantum circuit T-depth reduction method of claim 1, further comprising determining whether the first quantum circuit and the control P gate are swappable, wherein the swapping comprises swapping the first quantum circuit and the any one control P gate when the first quantum circuit and the control P gate are swappable.

3. The quantum circuit T-depth reduction method of claim 2, wherein the determining comprises that the first quantum circuit and the any one control P gate are swappable, when a phase when passing through the any one control P gate and the first quantum circuit and a phase when passing through the first quantum circuit and the any one control P gate after the any one control P gate and the first quantum circuit are swapped are the same.

4. The quantum circuit T-depth reduction method of claim 2, wherein the determining comprises:

removing a X gate, H gate and $R_z$ gate of the first quantum circuit; and determining that the first quantum circuit and the any one control P gate are swappable, when a control portion of a control NOT gate of the first quantum circuit, from which the X gate, H gate and $R_z$ gate are removed, is located on any one of two lines of the any one control P gate and a target portion is located on a third line.

5. The quantum circuit T-depth reduction method of claim 4, wherein the removing comprises removing all H gates located on two lines of the any one control P gate and removing all $R_z$ gates present in the first quantum circuit, after removing the X gate from the first quantum circuit through X gate propagation.

6. The quantum circuit T-depth reduction method of claim 1, further comprising converting the first quantum circuit into a second quantum circuit corresponding to a function of the first quantum circuit, when the first quantum circuit and the any one control P gate are swapped.

7. The quantum circuit T-depth reduction method of claim 1, wherein the adding comprises adding a pair of first control P gate and second control P gate in consideration of a control portion and target portion of the Toffoli gate.

8. The quantum circuit T-depth reduction method of claim 1, wherein the adding comprises adding a control P gate and a control P† gate to the quantum circuit.

9. A quantum circuit T-depth reduction method comprising:

adding a control P gate and a control P† gate to a quantum circuit including two Toffoli gates and a first quantum circuit between the two Toffoli gates;

determining whether the first quantum circuit and any one of the control P gate and the control P† gate are swappable;

swapping the first quantum circuit and any one gate when the first quantum circuit and any one gate are swappable.

10. The quantum circuit T-depth reduction method of claim 9, wherein the determining comprises:

removing a X gate, H gate and $R_z$ gate of the first quantum circuit; and determining that the first quantum circuit and the any one gate are swappable, when a control portion of a control NOT gate of the first quantum circuit, from which the X gate, H gate and $R_z$ gate are removed, is located on any one of two lines of the any one gate and a target portion is located on a third line.

11. The quantum circuit T-depth reduction method of claim 10, wherein the removing comprises removing all H gates located on two lines of the any one gate and removing all $R_z$ gates present in the first quantum circuit after removing the X gate from the first quantum circuit through X gate propagation.

12. The quantum circuit T-depth reduction method of claim 9, further comprising converting the first quantum circuit into a second quantum circuit corresponding to a function of the first quantum circuit when the first quantum circuit and the any one gate are swapped.

13. A quantum circuit T-depth reduction apparatus comprising:

a receiving unit configured to receive a quantum circuit including two Toffoli gates and a first quantum circuit between the two Toffoli gates;

an adding unit configured to add a pair of first control P gate and second control P gate to the quantum circuit; and an swap unit configured to swap the first quantum circuit and any one of the first control P gate and the second control P gate such that the first quantum circuit is disposed between the first control P gate and the second control P gate.

14. The quantum circuit T-depth reduction apparatus of claim 13, further comprising a determination unit configured to determine whether the first quantum circuit and the control P gate are swappable, wherein the adding unit adds the pair of first control P gate and second control P gate when the first quantum circuit and the control P gate are swappable.

15. The quantum circuit T-depth reduction apparatus of claim 14, wherein the determination unit determines that the first quantum circuit and the any one control P gate are swappable when a phase when passing through the any one control P gate and the first quantum circuit and a phase when passing through the first quantum circuit and the any one control P gate after the any one control P gate and the first quantum circuit are swapped are the same.

16. The quantum circuit T-depth reduction apparatus of claim 14, wherein the determination unit removes a X gate, H gate and $R_z$ gate of the first quantum circuit and determines that the first quantum circuit and the any one control P gate are swappable when a control portion of a control NOT gate of the first quantum circuit, from which the X gate, H gate and $R_z$ gate are removed, is located on any one of two lines of the any one control P gate and a target portion is located on a third line.

17. The quantum circuit T-depth reduction apparatus of claim 16, wherein the determination unit removes all H gates located on two lines of the any one control P gate and removes all $R_z$ gate present in the first quantum circuit, after removing the X gate from the first quantum circuit through X gate propagation.

18. The quantum circuit T-depth reduction apparatus of claim 13, further comprising a converting unit configured to convert the first quantum circuit into a second quantum circuit corresponding to a function of the first quantum circuit, when the first quantum circuit and the any one control P gate are swapped.

19. The quantum circuit T-depth reduction apparatus of claim 13, wherein the adding unit adds a pair of first control P gate and second control P gate in consideration of a control portion and target portion of the Toffoli gate.

20. The quantum circuit T-depth reduction apparatus of claim 13, wherein the adding unit adds a control P gate and a control P† gate to the quantum circuit.

* * * * *